United States Patent

Phillips

[11] Patent Number: 5,794,712
[45] Date of Patent: Aug. 18, 1998

[54] MOBILE FRAME

[75] Inventor: Laurence Colin Phillips, Merredin, Australia

[73] Assignee: Innotech Pty Ltd, Merredin, Australia

[21] Appl. No.: 669,732

[22] Filed: Jun. 26, 1996

[30] Foreign Application Priority Data

Jan. 14, 1994 [AU] Australia ............... PM3387
Jan. 16, 1995 [WO] WIPO ............ PCT/AU95/00020

[51] Int. Cl.⁶ ............ A01B 73/00; A01B 21/04; A01B 23/02
[52] U.S. Cl. ............ 172/459; 172/468; 172/548; 172/612; 172/637; 172/662; 172/690
[58] Field of Search ............ 172/452, 468, 172/612, 662, 690, 686, 685, 637, 548, 460, 459; 56/365, 367, 370, 377, 380, 384, 396, 228, 15.9, 14.9

[56] References Cited

U.S. PATENT DOCUMENTS

| 701,844 | 6/1902 | Clapp | 172/452 X |
|---|---|---|---|
| 741,487 | 10/1903 | Hailey | 172/612 X |
| 1,452,260 | 4/1923 | Stoffel | 172/690 X |
| 3,474,869 | 10/1969 | Mowbray et al. | 172/662 X |
| 3,771,608 | 11/1973 | Ancherico | 172/662 X |
| 4,171,726 | 10/1979 | Ward | 172/662 X |
| 4,452,318 | 6/1984 | Boetto | 172/662 X |
| 4,974,407 | 12/1990 | Rowe et al. | 56/15.9 X |
| 5,000,270 | 3/1991 | Phillips | 172/612 X |
| 5,111,636 | 5/1992 | Quirin | 56/370 X |
| 5,127,216 | 7/1992 | Kelderman | 56/15.9 |
| 5,143,160 | 9/1992 | May | 172/452 X |

FOREIGN PATENT DOCUMENTS

| 104942 | 9/1938 | Australia | 172/612 |
|---|---|---|---|
| 745395 | 7/1980 | U.S.S.R. | 172/612 |

Primary Examiner—Michael J. Carone
Assistant Examiner—Christopher J. Novosad
Attorney, Agent, or Firm—Carol W. Burton, Esq.; John R. Wahl, Esq.; Holland & Hart LLP

[57] ABSTRACT

A mobile frame (10) for supporting an elongate flexible structure (11) such as a ground working tool assembly, the mobile frame (10) is foldable between a first position in which the elongate flexible structure (11) is supported in a working condition in relation to the ground, and a second position in which the elongate flexible structure (11) is supported in a stored condition in relation to the ground. The mobile frame comprises a first frame portion (31) supported for movement over the ground and a second frame portion (32) for supporting one end of the elongate flexible structure. The second frame portion is mounted on the first frame portion for folding movement with respect thereto about a pivot axis inclined to the fore-and-aft axis of the mobile frame such that the spacing between the ends of the elongate flexible structure (11) increases as the elongate flexible structure is moved from the first position to the second position.

18 Claims, 5 Drawing Sheets

MOBILE FRAME

TECHNICAL FIELD

THIS INVENTION relates to a mobile frame for supporting an elongated structure such as a around working tool assembly, and to apparatus such as a around working implement employing such a frame.

BACKGROUND OF THE INVENTION

With such agricultural implements having farms which carry agricultural equipment such as ground working tools, it is common for the frames to be of a foldable construction so that one or more sections of the frame can be folded between raised and lowered conditions. The implements function normally when the sections are in the lowered condition. Raising the sections allows the overall width of the implement to be reduced for ease of transport.

With such agricultural implements, the sections typically fold about respective fold lines which are parallel to the fore-and-aft axis of the implement. While this construction is satisfactory in many cases, there are other cases in which it can present difficulties. One such case is where the frame supports an elongate, flexible structure which coatacts the ground during use of the implement. One such elongate, feible structure is a rotary harrow tool assembly, commonly referred to as a "prickle chain". An example of such a rotary harrow tool assembly is disclosed in Australian Patent No. 612585.

The rotary harrow tool assembly is supported at its ends within the frame for rotation about its longitudinal axis. Because of its flexible construction, the tool assembly tends to drape between its ends when one or both of the ends are elevated during folding of the frame into the raised condition. As a consequence, it is difficult to lift the draped tool assembly clear of the ground simply by folding the frame and supplementary lifting mechanisms are necessary.

It would be advantageous to provide a folding arrangement which brings about an increase in the spacing between the ends of the elongate, flexible structure as it is elevated during folding of the frame into the raised condition so as to reduce the extent of draping of the elongate, flexible structure.

SUMMARY OF THE INVENTION

The invention provides a mobile frame for supporting an elongate flexible structure having two ends, the mobile frame being foldable between a first position in which the elongate flexible structure is supported in a working condition in relation to the ground and a second position in which the elongate flexible structure is supported in a stored condition in relation to the ground, the mobile frame comprising a first frame portion supported for movement over the ground and a second frame portion for supporting one of said ends of the elongate flexible structure, the second frame portion being mounted on the first frame portion for folding movement with respect thereto about a pivot axis between the first position corresponding to the working condition of the elongate flexible structure and the second position corresponding to the stored condition of the elongate flexible structure, the pivot axis being inclined to the fore-and-aft axis of the mobile frame whereby the spacing between the ends of the elongate flexible structure is larger when the second frame portion is in the second position than when in the first position.

Preferably, the pivot axis is so inclined that it extends away from the fore-and-aft axis of the mobile frame in the forward direction.

While the other end of the elongate flexible structure may be supported in any suitable way on the mobile frame, it is preferable that the frame comprises a third frame portion for supporting said other end of the elongate flexible structure, the third frame portion being mounted on the first portion for folding movement with respect thereto about a further pivot axis. Conveniently, the further pivot axis is normal to the fore-and-aft axis of the mobile frame.

Conveniently, the mobile frame supports at least two of said elongate flexible structures, there being two of said second frame portions each supporting one end of a respective one of the two elongate flexible structures. Conveniently, the other end of each elongate flexible structure is connected to the third frame portion.

Preferably, the third frame portion includes a longitudinal element which extends generally parallel to the fore-and-aft axis of the mobile frame when in the working condition.

The invention further provides an apparatus including a mobile frame supporting an elongate flexible structure, the mobile frame being as set forth hereinbefore.

More particularly, the invention further provides apparatus comprising a mobile frame and an elongate flexible structure having two ends supported on the mobile frame, the mobile frame being foldable between a first position in which the elongate flexible structure is in a working condition and a second position in which the elongate flexible structure is in a stored condition, the mobile frame comprising a first frame portion supported for movement over the ground and a second frame portion to which one of said ends of the elongate flexible structure is connected, mounted on the first frame portion for folding movement with respect thereto about a pivot axis between the first position corresponding to the working condition of the elongate flexible structure and the second position corresponding to the stored condition of the elongate flexible structure, the pivot axis being inclined to the fore-and-aft axis of the mobile frame, whereby the spacing between the ends of the elongate flexible structure is larger when the second frame portion is in the second position than when in the first position.

Preferably, the pivot axis is so inclined that it extends away from the fore-and-aft axis of the mobile frame in the forward direction.

While the other end of the elongate flexible structure may be connected in any suitable way to the mobile frame, it is preferable that the frame comprises a third portion to which said other end is connected, the third frame portion being mounted on the first frame portion for folding movement with respect thereto about a further pivot axis. Conveniently, the further pivot axis is normal to the fore- and-aft axis of the mobile frame.

Conveniently, the apparatus comprises at least two of said elongate flexible structures, there being two of said second frame portions each supporting one end of a respective one of the two elongate flexible structures. Conveniently, the other end of each elongate flexible structure is connected to the third portion.

The invention still further provides an agricultural implement comprising a mobile frame and an elongate flexible ground working tool assembly supported on the mobile frame, the mobile frame being foldable between a first position in which the tool assembly is supported in a working condition in relation to the ground and a second position in which the tool assembly is supported in a stored condition in relation to the ground, the mobile frame comprising a first frame portion supported for movement over the ground and a second frame portion mounted on the first frame portion for folding movement with respect thereto about a pivot axis inclined to the fore-and-aft axis of the mobile frame, one end of the elongate flexible member being connected to the second portion whereby the spacing between the ends of the tool assembly increases as the second frame portion moves from the first position to the second position.

Preferably, the pivot axis is so inclined that it extends away from the fore-and-aft axis of the mobile frame in the forward direction and the second frame portion folds towards the forward side of the inclined pivot axis in moving from the first position to the second position.

BRIEF DESCRIPTION OF THE DRAWINGS

The invention will be better understood by reference to the following description of one specific embodiment thereof as shown in the accompanying drawings in which.

MODES OF PERFORMING INVENTION

Figure 1:
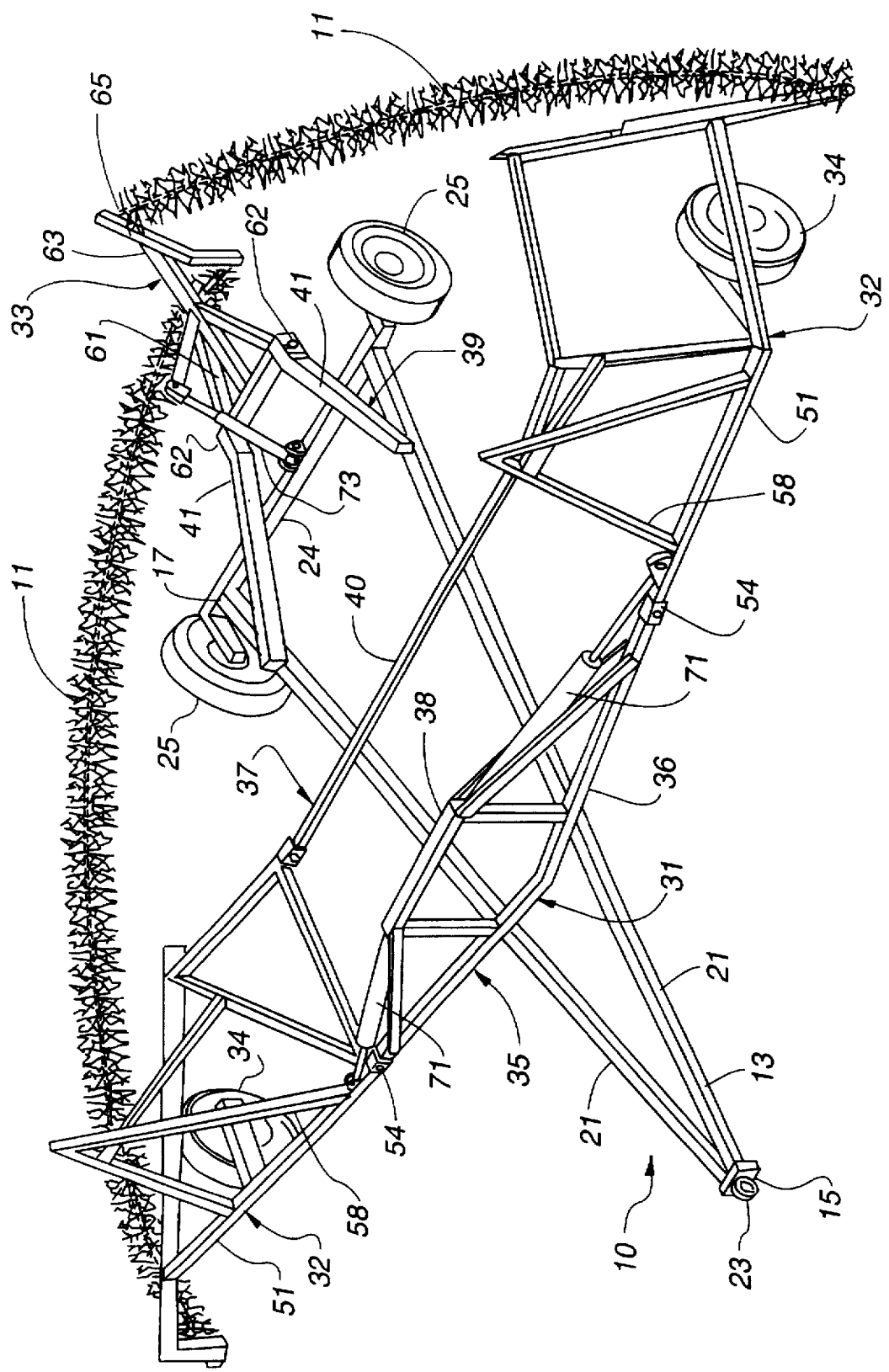
FIG. 1 is a schematic perspective view of an agricultural ground working implement incorporating a mobile frame according to the embodiment, the frame being shown in a working condition.

Referring to the drawings, there is known an agricultural around working implement comprising a mobile frame 10 supporting two elongated ground working tool assemblies 11 such as rotary harrow tool assemblies of the type disclosed in Australian Patent No. 612585. The two tool assemblies 11 are inclined with respect to tie direction of travel and in opposed relation to each other, as is conventional practice. Each tool assembly 11 is flexible along its length and is supported at its ends for rotation about its longitudinal axis.

Figure 2:
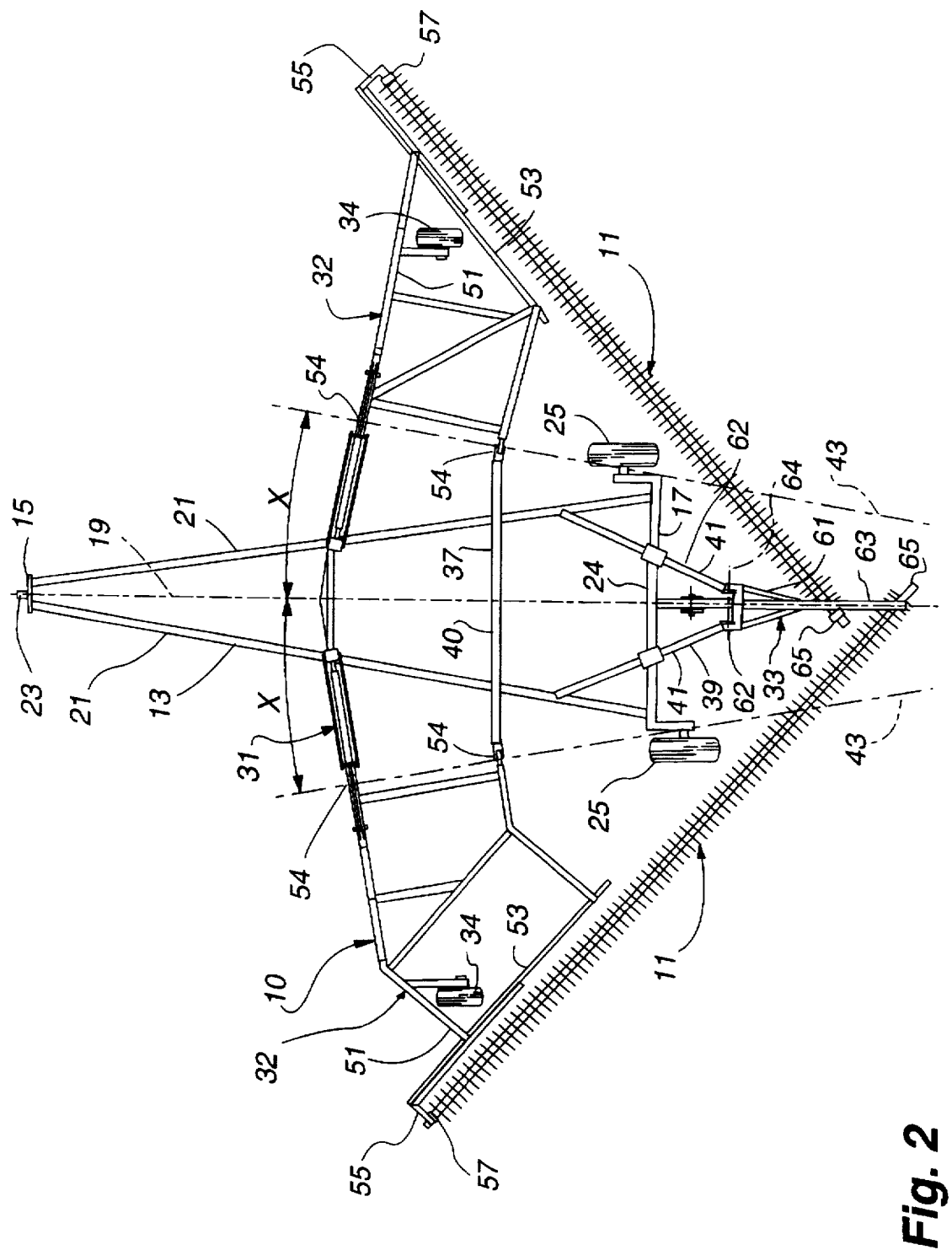
FIG. 2 is a plan view of the implement in the condition shown in FIG. 1.

The mobile frame 10 comprises a chassis structure 13 having a leading end 15, a trailing end 17 and a fore-and-aft axis 19 (as shown in FIG. 2). The chassis structure 13 includes a pair of longitudinal elements 21 which extend forwardly and inwardly with respect to the fore-and-aft axis towards a towing coupling 23 by means of which the chassis structure can be detachably secured to a towing vehicle such as a tractor. The chassis structure 13 further includes a transverse element 24 which is at the trailing end thereof and which extends between the longitudinal elements 21. The chassis structure is supported on ground engaging wheels 25 adjacent the trailing end. The ground wheels 25 are off-set in relation to each other (as best seen in FIGS. 1 and 2) to avoid obstruction with the ground working tool assemblies.

The chassis structure 13 supports a first frame portion 31, two second frame portions 32 and a third frame portion 33.

The first frame portion 31 comprises a leading beam structure 35, an intermediate beam structure 37 and a trailing beam structure 39.

The leading beam structure 35 comprises a leading beam 36 extending transversely of the fore-and-aft axis of the implement to each side of the chassis 13, and an upstanding frame 38 mounted on the leading beam 36.

The intermediate beam structure 37 comprises an intermediate beam 40 extending transversely of the fore-and-aft axis of the implement to each side of the chassis structure 13.

The trailing beam structure 39 comprises two spaced beams 41 which are supported on the chassis structure 13 and which extend rearwardly thereof in an inward direction towards the fore-and-aft axis.

Each second frame portion 32 has a ground wheel 34 and is pivotally mounted onto the first frame portion 31 for folding movement about a pivot axis defining a fold line 43 (see FIG. 2) which is inclined to the fore-and-aft axis 19 of the chassis structure 13. In the embodiment, the angle of inclination (indicated by reference character X in FIG. 2) is approximately 10°, but it is not limited thereto and may be any other suitable angle.

Each of the second frame portions 32 comprises a frame structure 51 which is pivotally mounted at hinges 54 onto adjacent ends of the leading and intermediate beam structures 35 and 37 respectively of the first portion 31. Each frame structure 51 includes a supporting beam 53 having an outwardly projecting portion 55 to which one end of the respective tool assembly 11 is connected by way of a rotary coupling 57.

Upstanding stops 58 are provided on the two second frame portions 32 to limit inward folding movement of the second frame portions 32 with respect to the first frame portion 31, as will be described later.

The third frame portion 33 comprises a frame structure 61 incorporating a tail beam 63. The frame structure 61 is pivotally mounted at hinges 62 onto the trailing beam structure 39 of the first portion 31 for folding movement about a fold line 64 (see FIG. 2) normal to the fore-and-aft axis of the chassis structure. The tail beam 63 supports two rotary couplings 65 each of which respectively supports the ends of the tool assemblies 1'remote from the second frame portions 32.

Figure 3:
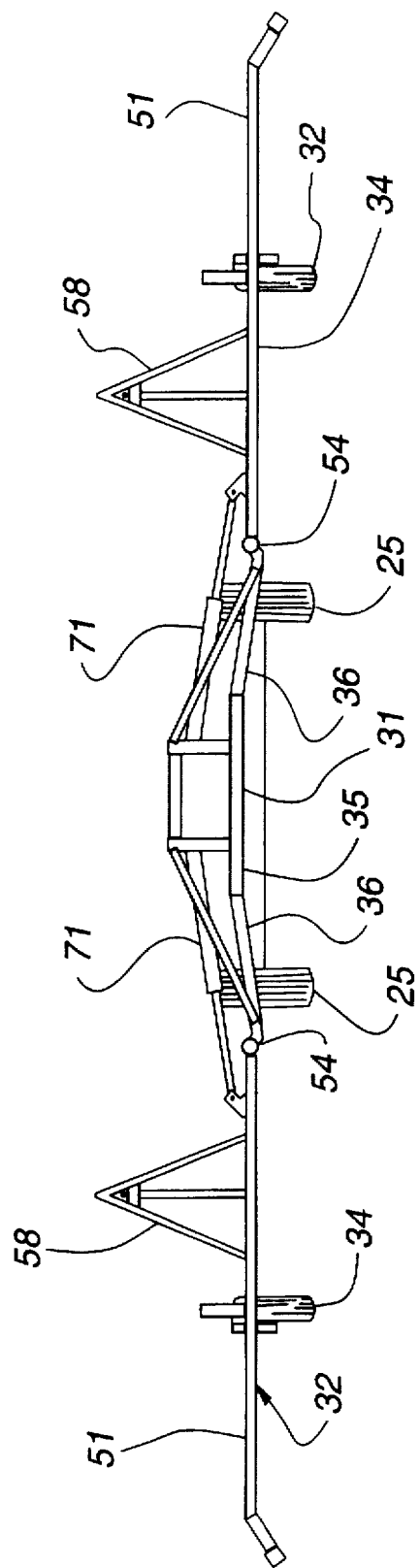
FIG. 3 is a front view of the implement in the condition shown in FIG. 1 but without the tool assembly.
Figure 4:
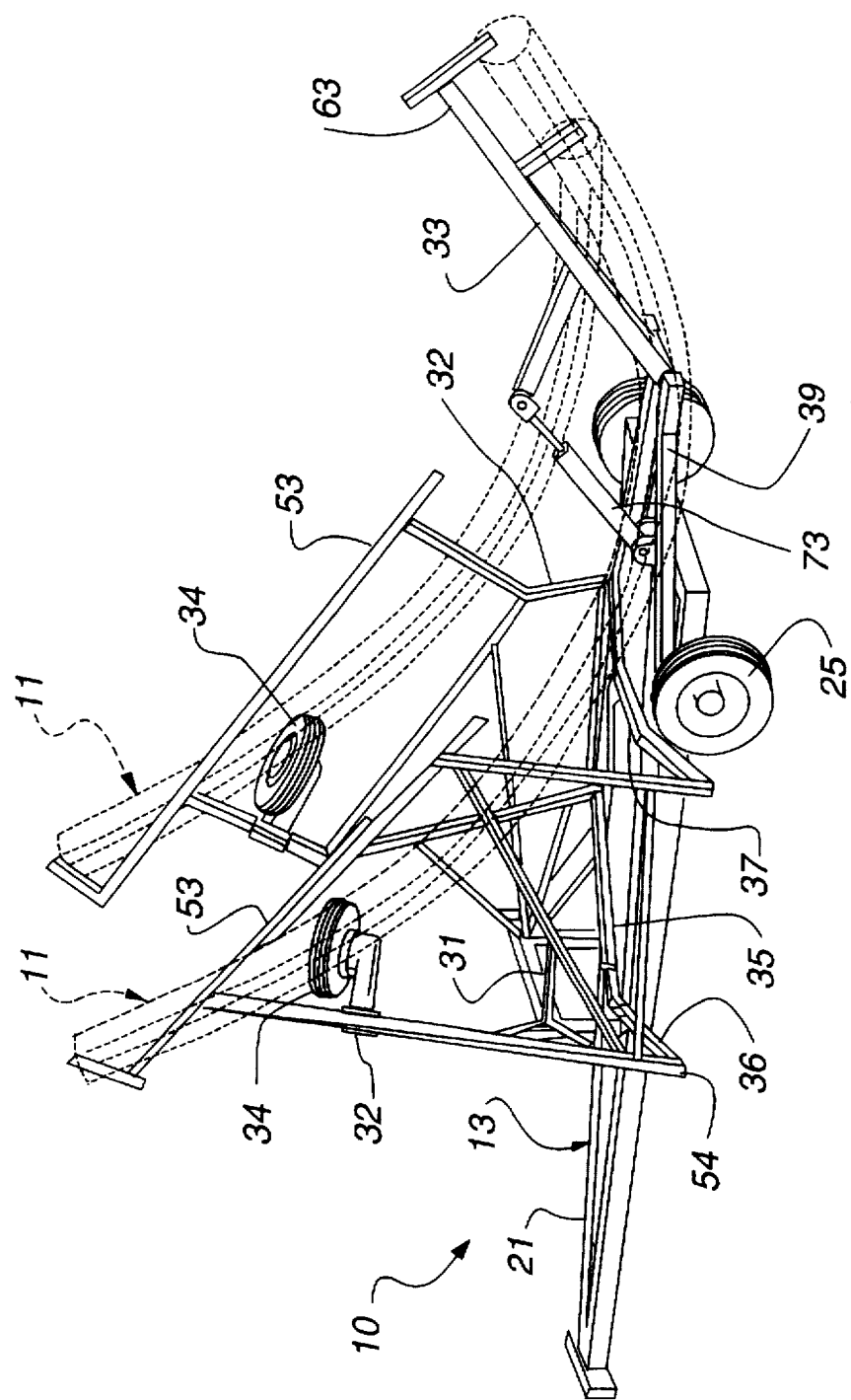
FIG. 4 is a schematic perspective view of the agricultural ground working implement, with the mobile frame being shown in a folded condition.
Figure 5:
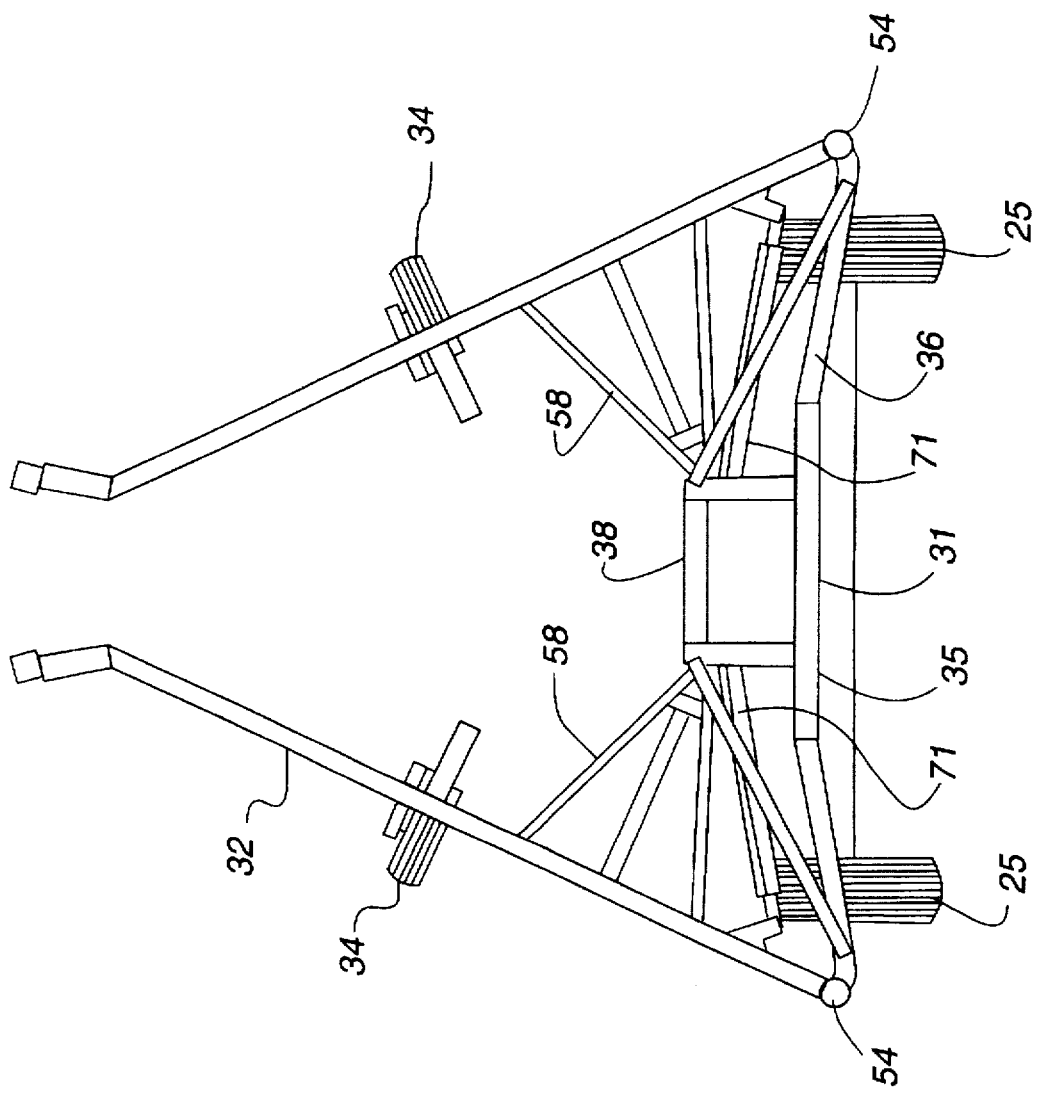
FIG. 5 is a front view of the implement in the condition shown in FIG. 4 but without the tool assembly.

The two second frame portions 32 and the third frame portion 33 are mounted on the first frame portion 31, for folding movement with respect thereto between a first position in which they support the tool assemblies 11 in a working condition in relation to the ground (as shown in FIGS. 1, 2 and 3) and a second position in which the second and third frame portions are raised whereby the ends of the tool assemblies are elevated such that the tool assemblies are supported clear of the ground for transportation and storage purposes (as shown in FIGS. 4 and 5).

The stops 58 engage against the upstanding frame 38 on the first frame portion 31 to limit the inward folding movement of the second frame portions 32 and provide support therefor when in the folded condition.

Any suitable mechanisms can be provided for folding the second and third frame portions 32 and 33 respectively with respect to the first portion 31. In this embodiment such mechanisms comprise two first hydraulic rams 71 pivotally connected between the second frame portions 32 and the upstanding frame 38 on the leading beam structure 35, and a second hydraulic ram 73 pivotally connected between the third frame portion 33 and the chassis structure 13.

The feature whereby the folding axis 43 of each second portion 32 is inclined with respect to the fore-and-aft axis of the chassis structure results in the leading end of each tool assembly being moved forwardly as well as inwardly when the tool assembly is moved from the working condition to the elevated condition. The forward component this movement takes up at least some of the slack which is induced in the tool assembly 11 when it is lifted clear of, and hence no longer supported by, the around. If it were not for the forward movement taking up some of the slack in the tool assembly, a supplementary arrangement would be required to maintain the tool assembly clear of the ground, as is the case with conventional folding frames in which there is a fold line parallel to the fore-and-aft axis. The minor extent of forward movement of the trailing end of each tool assembly which arises on upward pivotal movement of the third frame portion 33 is minor in comparison to the forward movement of the leading end of the tool assembly 11 and so does not have a negating effect.

From the foregoing, it is evident that the present invention provides a simple yet highly effective arrangement for supporting the tool assemblies in an elevated condition clear of the ground.

It should be appreciated that the scope of the present invention is not limited to the particular scope of the embodiment described above. In particular, it should be appreciated that the invention is not limited to a mobile frame for supporting a ground working tool assembly.

I claim:

1. A mobile frame for supporting an elongate flexible structure having two ends, the mobile frame having a fore-and-aft axis aligned with the direction of travel thereof and being foldable between a first position in which the elongate flexible structure is supported in a working condition in relation to the ground and a second position in which the elongate flexible structure is supported in a stored condition in relation to the ground, the mobile frame comprising a first frame portion supported for movement over the ground and a second frame portion for supporting one of said ends of the elongate flexible structure, the second frame portion being mounted on the first frame portion for folding movement with respect thereto about a pivot axis between the first position corresponding to the working condition of the elongate flexible structure and the second position corresponding to the stored condition of the elongate flexible structure, the pivot axis being inclined to the fore-and-aft axis of the mobile frame whereby the spacing between the ends of the elongate flexible structure increases at least during some part of movement of the second frame portion from the first position to the second position.

2. The mobile frame according to claim 1 wherein the pivot axis is so inclined that it extends away from the fore-and-aft axis of the mobile frame in the forward direction.

3. The mobile frame according to claim 1 or 2 further comprising a third frame portion for supporting the other of said ends, the third frame portion being mounted on the first portion for folding movement with respect thereto about a further pivot axis.

4. The mobile frame according to claim 3 wherein the third frame portion includes a longitudinal element which extends generally parallel to the fore-and-aft axis of the mobile frame when the elongate flexible member is in the working condition.

5. The mobile frame according to claim 1 wherein the further pivot axis is normal to the fore-and-aft axis of the mobile frame.

6. The mobile frame according to claim 1 wherein the mobile frame supports at least two of said elongate flexible structures, there being two of said second frame portions each supporting one end of a respective one of the two elongate flexible structures.

7. A mobile frame according to claim 6 wherein the other end of each elongate flexible structure is connected to the third frame portion.

8. Apparatus comprising a mobile frame having a fore-and-aft axis aligned with the direction of travel thereof and an elongate flexible structure having two ends supported on the mobile frame, the mobile frame being foldable between a first position in which the elongate flexible structure is in a working condition and a second position in which the elongate flexible structure is in a stored condition, the mobile frame comprising a first frame portion supported for movement over the ground and a second frame portion to which one of said ends of the elongate flexible structure is connected, mounted on the first frame portion for folding movement with respect thereto about a pivot axis between the first position corresponding to the working condition of the elongate flexible structure and the second position corresponding to the stored condition of the elongate flexible structure, the pivot axis being inclined to the fore-and-aft axis of the mobile frame, whereby the spacing between the ends of the elongate flexible structure increases at least during some part of movement of the second frame portion from the first position to the second position.

9. Apparatus according to claim 8 wherein the pivot axis is so inclined that it extends away from the fore-and-aft axis of the mobile frame in the forward direction.

10. Apparatus according to claim 8 wherein the mobile frame further comprises a third frame portion to which said other end is connected, the third frame portion being mounted on the first frame portion for folding movement with respect thereto about a further pivot axis.

11. Apparatus according to claim 10 wherein the further pivot axis is normal to the fore-and-aft axis of the mobile frame.

12. Apparatus according to claim 8 wherein the apparatus comprises at least two of said elongate flexible structures, there being two of said second frame portions each supporting one end of a respective one of the two elongate flexible structures.

13. Apparatus according to claim 12 wherein the other end of each elongate flexible structure is connected to the third portion.

14. An agricultural implement comprising a mobile frame having a fore-and-aft axis aligned with the direction of travel thereof and an elongate flexible ground working tool assembly supported on the mobile frame, the mobile frame being foldable between a first position in which the tool assembly is supported in a working condition in relation to the ground and a second position in which the tool assembly is supported in a stored condition in relation to the ground, the mobile frame comprising a first frame portion supported for movement over the ground and a second frame portion mounted on the first frame portion for folding movement with respect thereto about a pivot axis inclined to the fore-and-aft axis of the mobile frame, one end of the elongate flexible ground working tool assembly being connected to the second portion whereby the spacing between the ends of the tool assembly increases at least during some part of movement of the second frame portion from the first position to the second position.

15. The agricultural implement according to claim 14 wherein the pivot axis is so inclined that it extends away from the fore-and-aft axis of the mobile frame in the forward direction and the second frame portion folds forwardly in moving from the first position to the second position.

16. A mobile frame for supporting an elongate flexible structure having two ends, the mobile frame having a fore-and-aft axis aligned with the direction of travel thereof and being foldable between a first position in which the elongate flexible structure is supported in a working condition in relation to the ground and a second position which is inward of the first position and in which the elongate flexible structure is supported in a stored condition in relation to the ground, the mobile frame comprising a first frame portion supported for movement over the ground and a second frame portion for supporting one of said ends of the elongate flexible structure, the second frame portion being mounted on the first frame portion for folding movement with respect thereto about a pivot axis between the first position corresponding to the working condition of the elongate flexible structure and the second position corresponding to the stored condition of the elongate flexible structure, the pivot axis being inclined to the fore-and-aft axis of the mobile frame whereby said one of said ends of the elongate flexible structure is moved forwardly as well as inwardly upon movement of the first frame portion from the first position to the second position.

17. Apparatus comprising a mobile frame having a fore-and-aft axis aligned with the direction of travel thereof and an elongate flexible structure having two ends supported on the mobile frame, the mobile frame being foldable between a first position in which the elongate flexible structure is in a working condition and a second position which is inward of the first position and in which the elongate flexible structure is in a stored condition, the mobile frame comprising a first frame portion supported for movement over the ground and a second frame portion to which one of said ends of the elongate flexible structure is connected, mounted on the first frame portion for folding movement with respect thereto about a pivot axis between the first position corresponding to the working condition of the elongate flexible structure and the second position corresponding to the stored condition of the elongate flexible structure, the pivot axis being inclined to the fore-and-aft axis of the mobile frame, said one of said ends of the elongate flexible structure is moved forwardly as well as inwardly upon movement of the first frame portion from the first position to the second position.

18. An agricultural implement comprising a mobile frame having a fore-and-aft axis aligned with the direction of travel thereof and an elongate flexible ground working tool assembly supported on the mobile frame, the mobile frame being foldable between a first position in which the tool assembly is supported in a working condition in relation to the ground and a second position which is inward of the first position and in which the tool assembly is supported in a stored condition in relation to the ground, the mobile frame comprising a first frame portion supported for movement over the ground and a second frame portion mounted on the first frame portion for folding movement with respect thereto about a pivot axis inclined to the fore-and-aft axis of the mobile frame, one end of the elongate flexible ground working tool assembly being connected to the second portion whereby said one end is moved forwardly as well as inwardly upon movement of the first frame portion from the first position to the second position.

* * * * *